(12) United States Patent
Shen et al.

(10) Patent No.: US 10,914,104 B2
(45) Date of Patent: Feb. 9, 2021

(54) PIVOTING MECHANISM AND ELECTRONIC DEVICE

(71) Applicant: Acer Incorporated, New Taipei (TW)

(72) Inventors: Chao-Di Shen, New Taipei (TW); Kai-Lin Chang, New Taipei (TW); Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/721,826

(22) Filed: Dec. 19, 2019

(65) Prior Publication Data

US 2020/0263466 A1   Aug. 20, 2020

(30) Foreign Application Priority Data

Feb. 16, 2019   (TW) .............................. 108105219 A (51) Int. Cl.
| | | |
|---|---|---|
| *G06F 1/02* | (2006.01) | |
| *E05D 5/12* | (2006.01) | |
| *G06F 1/16* | (2006.01) | |
| *E05D 5/14* | (2006.01) | |
| *E05D 5/10* | (2006.01) | |

(52) U.S. Cl.
CPC ............... *E05D 5/128* (2013.01); *E05D 5/14* (2013.01); *G06F 1/1683* (2013.01); *E05D 2005/102* (2013.01)

(58) Field of Classification Search
CPC ...................................................... G06F 1/1683
See application file for complete search history.

(56) References Cited

U.S. PATENT DOCUMENTS

2006/0048337 A1 * 3/2006 Lowry .................... E05C 17/64
16/342
2010/0071161 A1 * 3/2010 Wang .................... G06F 1/1616
16/339

FOREIGN PATENT DOCUMENTS

| CN | 103207645 | 7/2013 |
| TW | M453751 | 5/2013 |
| TW | M551806 | 11/2017 |

* cited by examiner

*Primary Examiner* — Jerry Wu
(74) *Attorney, Agent, or Firm* — JCIPRNET (57) ABSTRACT

A pivoting mechanism includes a first hollow tube and a second hollow tube. The second hollow tube is rotatably sleeved on the first hollow tube to generate a torsion force with the first hollow tube. An electronic device is also provided.

11 Claims, 8 Drawing Sheets

PIVOTING MECHANISM AND ELECTRONIC DEVICE

CROSS-REFERENCE TO RELATED APPLICATION

This application claims the priority benefit of Taiwan application serial no. 108105219, filed on Feb. 16, 2019. The entirety of the above-mentioned patent application is hereby incorporated by reference herein and made a part of this specification.

BACKGROUND

Technical Field

The present disclosure relates to a pivoting mechanism and an electronic device, and more particularly to a pivoting mechanism that can be directly used as an appearance member and an electronic device using the pivoting mechanism.

Description of Related Art

In general, a folding device is mostly composed of two members, such as a host and a display, or a body and a support bracket, and the folding device usually has a pivoting mechanism, a rotating shaft connected between the two members for example, that can be driven by an external force to be reciprocatingly rotated so as to fold or unfold the two members, and it is benefit for operating or storing the folding device. However, the pivoting mechanism can greatly reduce the aesthetics of the folding device if no exterior part being added, and once the exterior part is added to cover the pivoting mechanism for aesthetics reason, it would enhance a total thickness of the folding device and more spaces are also required. Therefore, it has become one of the problems to be solved at present that how the pivoting mechanism provided in both of aesthetics and thin appearance.

SUMMARY

The present disclosure provides a pivoting mechanism to be an appearance member and has lower thickness.

The present disclosure provides an electronic device including the pivoting mechanism above to meet the trend of lightweight and slim design.

The pivoting mechanism provided in the present disclosure comprises a first hollow tube and a second hollow tube, wherein the second hollow tube is sleeved on the first hollow tube to generate a torsion force with the first hollow tube.

The electronic device provided in the present disclosure comprises a first body and at least one pivoting mechanism. The first body comprises a main body and a bracket. The pivoting mechanism comprises a first hollow tube and a second hollow tube, wherein the second hollow tube is sleeved on the first hollow tube to generate a torsion force with the first hollow tube. The main body and the bracket are rotated relatively via the pivoting mechanism.

Based on the above, in the design of the pivoting mechanism of the present disclosure, the second hollow tube is rotatably sleeved on the first hollow tube to generate a torsion force with the first hollow tube. Therefore, the pivoting mechanism of the present disclosure has simple assembling procedure to effectively reduce the manufacturing cost. Since the pivoting mechanism of the present disclosure adopts the design structure of hollow tube as a pivoting member, such that the first hollow tube and the second hollow tube can be respectively used as the appearance members. The pivoting mechanism of the present disclosure is much lightweight and thinner as compared to the conventional pivoting mechanism being added with appearance member.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
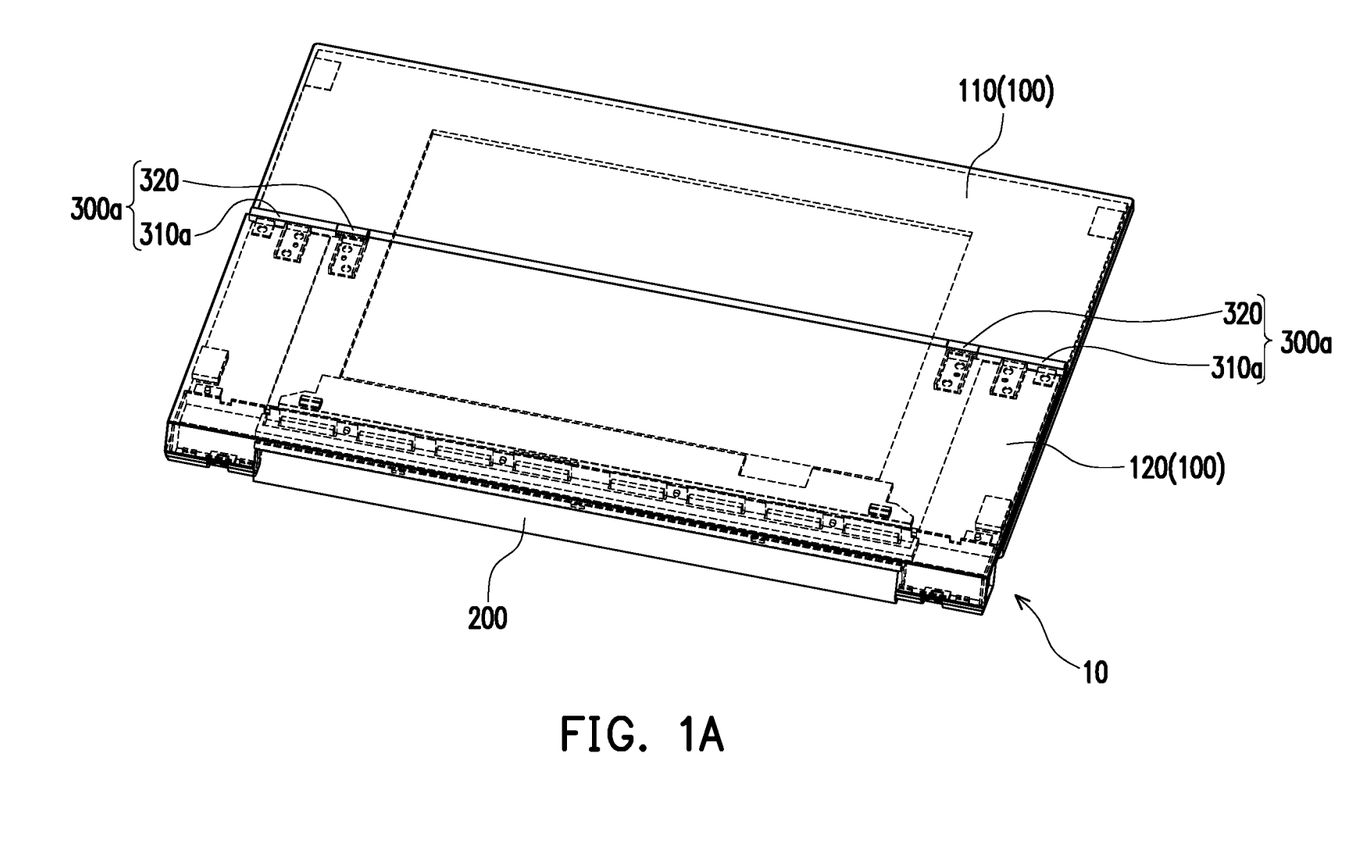
FIG. 1A is a schematic view of an electronic device according to an embodiment of the present disclosure.
Figure 1B:
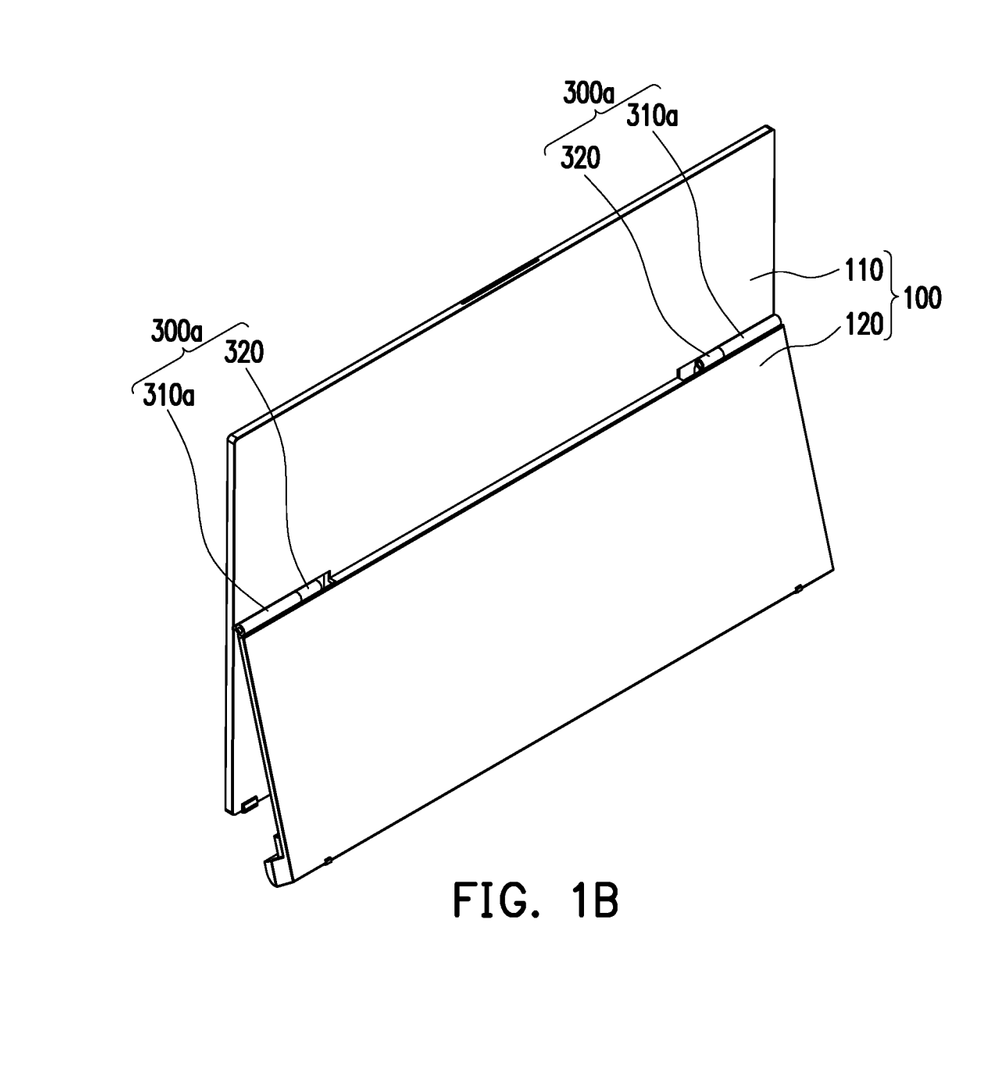
FIG. 1B is a perspective view of a main body of a first body of the electronic device in FIG. 1A being pivoted relative to a bracket with an angle by a pivoting mechanism.
Figure 2A:
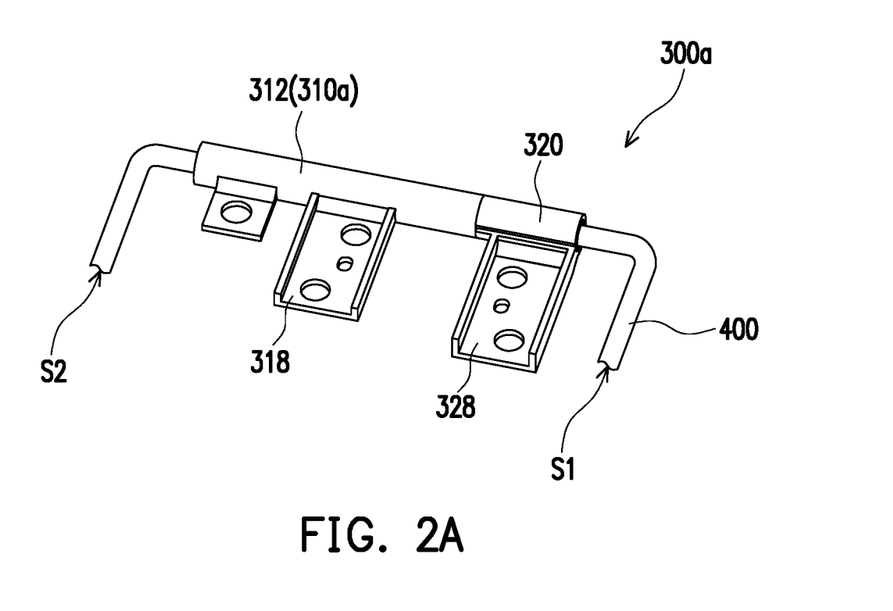
FIG. 2A is a perspective view of an electric wire of the electronic device penetrating the pivoting mechanism.
Figure 2B:
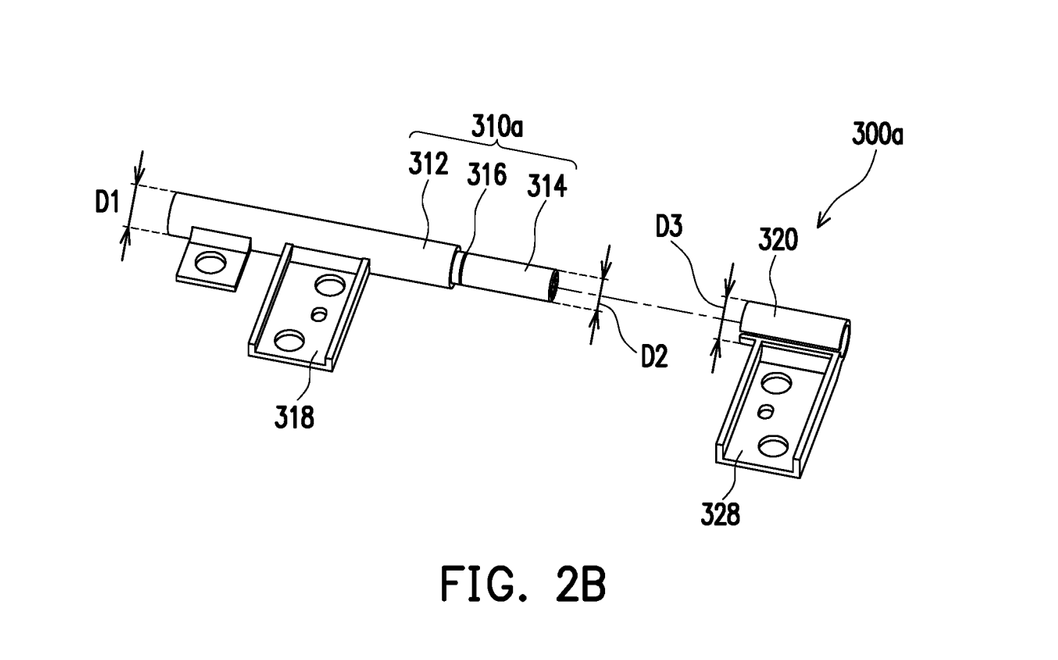
FIG. 2B is a perspective exploded view of the pivoting mechanism in FIG. 2A.
Figure 2C:
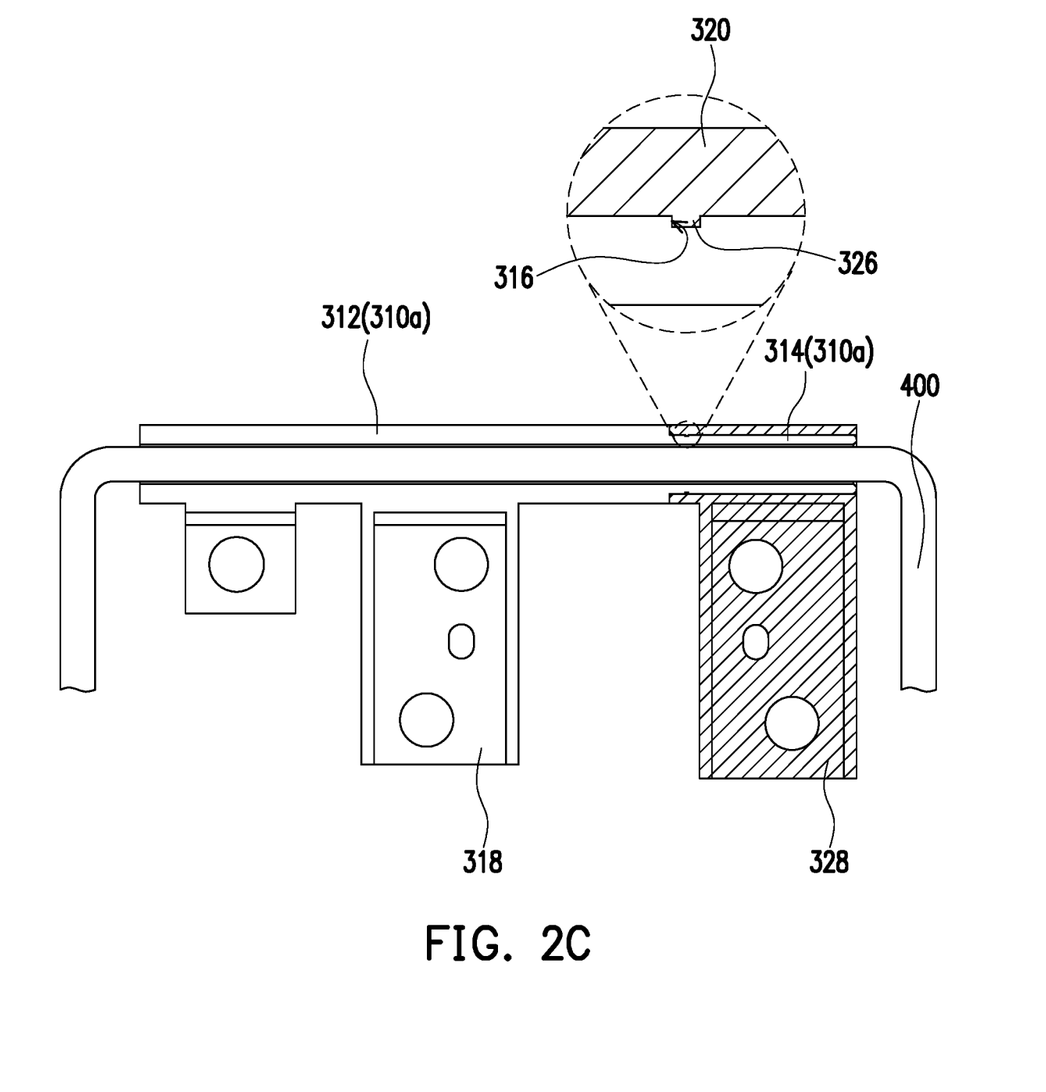
FIG. 2C is a cross-sectional view of the pivoting mechanism in FIG. 2A.

FIG. 1A is a schematic view of an electronic device according to an embodiment of the present disclosure. FIG. 1B is a perspective view of a main body of a first body of the electronic device in FIG. 1A being pivoted relative to a bracket with an angle by a pivoting mechanism. FIG. 2A is a perspective view of an electric wire of the electronic device penetrating the pivoting mechanism. FIG. 2B is a perspective exploded view of the pivoting mechanism in FIG. 2A. FIG. 2C is a cross-sectional view of the pivoting mechanism in FIG. 2A.

Referring to FIG. 1A and FIG. 1B, in the present embodiment, an electronic device 10 comprises a first body 100 and at least one pivoting mechanism 300a. The first body 100 comprises a main body 110 and a bracket 120. The pivoting mechanism 300a comprises a first hollow tube 310a and a second hollow tube 320. The first hollow tube 310a is pivoted to the bracket 120 of the first body 100. The second hollow tube 320 is pivoted to the main body 110 of the first body 100 and rotatably sleeved on the first hollow 310 to generate a torsion force with the first hollow tube 310a, and the main body 110 rotates relative to the bracket 120.

In detail, referring to FIG. 2A, FIG. 2B, and FIG. 2C simultaneously, the first hollow tube 310a comprises a main portion 312 and an extending portion 314. The extending portion 314 is connected to the main portion 312, and an outer diameter D2 of the extending portion 314 is less than an outer diameter D1 of the main portion 312. That is, the outer diameter D1 of the main portion 312 of the first hollow tube 310a is greater than the outer diameter D2 of the extending portion 314. An outer diameter D3 of the second hollow tube 320 is greater than the outer diameter D2 of the extending portion 314, and the second hollow tube 320 is sleeved on the extending portion 314 of the first hollow tube 310a. It also means that the extending portion 314 of the first hollow tube 310a is covered by the second hollow tube 320. In the embodiment, the outer diameter D3 of the second hollow tube 320 is approximately equal to the outer diameter D1 of the main portion 312 of the first hollow tube 310a, and the pivoting mechanism 300a has better assembling flatness and overall aesthetics.

Furthermore, the first hollow tube 310a comprises a first locking portion 316 and the second hollow tube 320 comprises a second locking portion 326, such that the first locking portion 316 and the second locking portion 326 are configured to prevent a relative motion of the first hollow tube 310a and the second hollow tube 320. The first locking portion 316 and the second locking portion 326 are locked with each other to limit the relative motion of the first hollow tube 310a and the second hollow tube 320. It also means that the first locking portion 316 and the second locking portion 326 are interfered with each other to stop the relative motion of the first hollow tube 310a and the second hollow tube 320. One of the first locking portion 316 and the second locking portion 326 is a locking block, and the other one is a locking slot, wherein the first locking portion 316 is embodied as a locking slot, and the second locking portion 326 is embodied as a locking slot, but the disclosure is not limited thereto.

Furthermore, in order to fix the pivoting mechanism 300a effectively, the first hollow tube 310a of the present embodiment comprises a first fixing plate 318 fixed to the main body 110 of the first body 100, and the second hollow tube 320 comprises a second fixing plate 328 fixed to the bracket 120 of the first body 100. The first fixing plate 318 and the second fixing plate 328 are fixed to the main body 110 and the bracket 120 respectively by screws or bolts, but not limited thereto.

In addition, referring to FIG. 1A, FIG. 1B and FIG. 2A, the electronic device 10 of the embodiment further comprises a second body 200 and an electric wire 400. The second body 200 is pivoted to the first body 100, and the first body 100 could be spread out or closed to the second body 200 via the pivoting mechanism 300a. The electric wire 400 has a first end S1 and a second end S2 opposite to each other. The electric wire 400 penetrates the first hollow tube 310a and the second hollow tube 320 of the pivoting mechanism 300a, wherein the first end S1 of the electric wire 400 is electrically connected to the first body 100, and the second end S2 of the electric wire 400 is electrically connected to the second body 200. In the embodiment, the electronic device 10 is, for example, a notebook computer, and the main body 110 of the first body 100 is, for example, a display module. The bracket 120 of the first body 100 is, for example, a metal bracket, and the second body 200 is, for example, a system host. It should be noted that, in another embodiment not shown, the electronic device may not include the second body, wherein the main body of the first body is, for example, a tablet computer, and the bracket of the first body is, for example, a metal bracket, which are still belonged to a range of the present disclosure.

It is described in short that the second hollow tube 320 is rotatably sleeved on the first hollow tube 310a to generate a torsion force therebetween, such that the pivoting mechanism 300a of the present disclosure has simple assembling procedure to effectively reduce the manufacturing cost. The main body 110 and the bracket 120 of the first body 100 are rotated relatively via the pivoting mechanism 300a to be folded or unfolded. Moreover, since the pivoting mechanism 300a of the present embodiment employs the design of hollow tube structure as a pivoting member, the first hollow tube 310a and the second hollow tube 320 can be respectively used as the appearance members. The pivoting mechanism 300a of the present embodiment have less thickness, and the electronic device 10 with the pivoting mechanism 300a of the present embodiment could conform to the trend of lightweight and slim.

It is to be noted that the following embodiments with the same reference numerals and parts of the above-mentioned embodiments, and the same reference numerals are used to refer to the same or similar elements, and the description of the same technical content is omitted. For the description of the omitted portions, reference may be made to the foregoing embodiments, and the following embodiments are not repeated.

Figure 3:
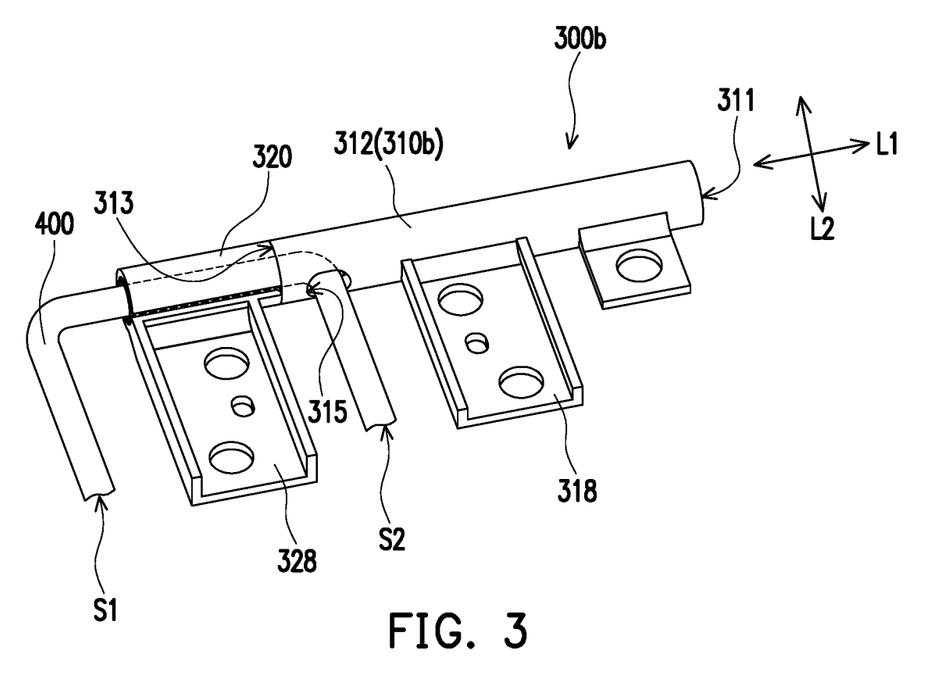
FIG. 3 is a schematic view of a pivoting mechanism and an electric wire according to another embodiment of the present disclosure.

FIG. 3 is a schematic view of a pivoting mechanism and an electric wire according to another embodiment of the present disclosure. Referring to FIG. 2A and FIG. 3, a pivoting mechanism 300b is similar to the pivoting mechanism 300a in FIG. 2A, and the difference between them is that a first hollow tube 310b of the pivoting mechanism 300b comprises a first opening 311, a second opening 313, and a third opening 315. The first opening 311 and the second opening 313 are located at opposite two ends of the first hollow tube 310b, and the third opening 315 is located between the first opening 311 and the second opening 313, wherein a facing direction L2 of the third opening 315 is different from a facing direction L1 of the second opening 313.

In one aspect of the embodiment, the second end S2 of the electric wire 400 penetrating the second hollow tube 320, the second opening 313 of the first hollow tube 310b, and the third opening 315 of the first hollow tube 310b sequentially to electrically connect to the second body 200 (depicted in FIG. 1A), such that the first end S1 of the electric wire 400 electrically connected to the first body 100 (depicted in FIG. 1A). In another aspect, the first end S1 of the electric wire 400 penetrating the third opening 315 of the first hollow tube 310b, the second opening 313 of the first hollow tube 310b, and the second hollow tube 320 sequentially to electrically connect to the first body 100 (depicted in FIG. 1A), such that the second end S2 of the electric wire 400 electrically connect to the second body 200 (depicted in FIG. 1A).

In addition to the first opening 311 and the second opening 313, the first hollow tube 310b of the present embodiment further comprises the third opening 315 different from the first opening 311 and the second opening 313 so as to increase the flexibility of the configuration of the electric wire 400, such that the user can select the outlet position of the electric wire 400 according to the size of the space in which the pivoting mechanism 300b is disposed. In short, the pivot mechanism 300b of the present embodiment can have better flexibility of use.

Figure 4A:
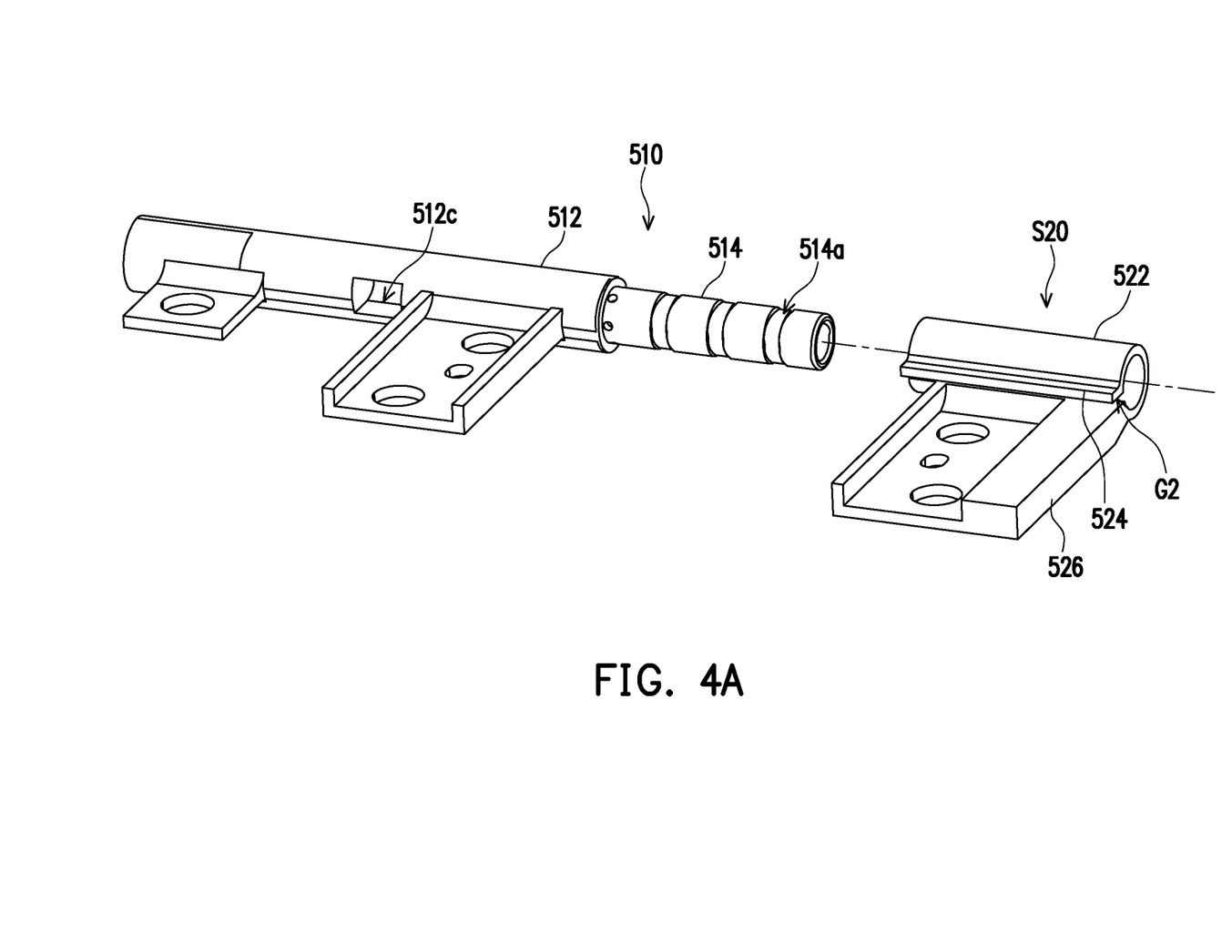
FIG. 4A is a perspective exploded view of a pivoting mechanism according to another embodiment of the present disclosure.
Figure 4B:
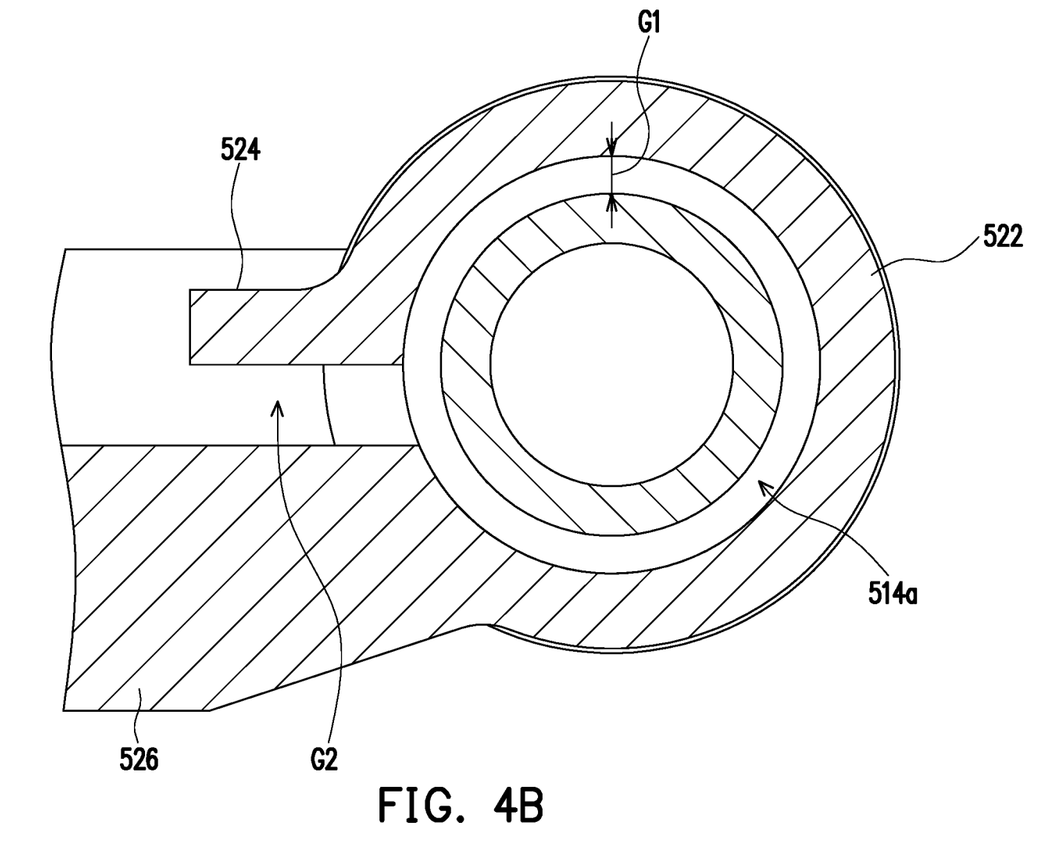
FIG. 4B is a partial cross-sectional view of the pivoting mechanism in FIG. 4A.
Figure 4C:
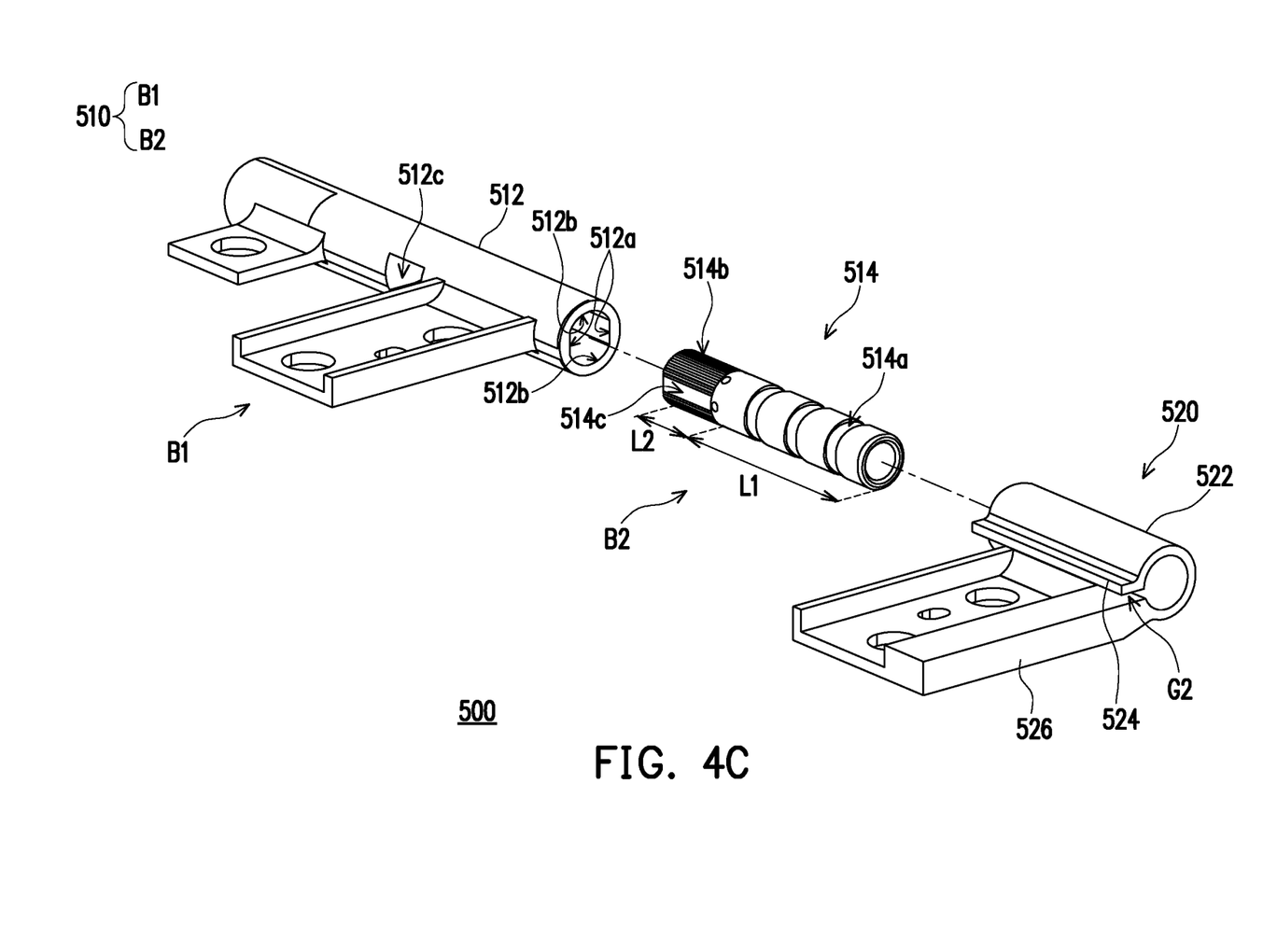
FIG. 4C is another perspective exploded view of the pivoting mechanism in FIG. 4A.

FIG. 4A is a perspective exploded view of a pivoting mechanism according to another embodiment of the present disclosure. FIG. 4B is a partial cross-sectional view of the pivoting mechanism in FIG. 4A. FIG. 4C is another perspective exploded view of the pivoting mechanism in FIG. 4A.

Referring to FIG. 4A and FIG. 4B, a pivoting mechanism 500 comprises a first hollow tube 510 and a second hollow tube 520, wherein the first hollow tube 510 comprises a main portion 512 and an extending portion 514 extended from the main portion 512, and outer diameters of the main portion 512, the extending portion 514, and the second hollow tube 520 are similar to the embodiments above. What the difference of the present embodiment from the above embodiments above is the first hollow tube 510 comprises at least one groove 514a located on the extending portion 514, and a space G1 is existed between the groove and an inner wall of the second hollow tube 520 when the second hollow tube 520 is sleeved on the extending portion 514. Besides, a cross section of the second hollow tube 520 is a non-closed contour, and the second hollow tube 520 comprises a rib 524 extending outwardly from an edge of the non-closed contour. Specifically, the second hollow tube 520 comprises a tubing body 522, a fixing plate 526 and the rib 524 are respectively extended from opposite edges of the tubing body 522, such that a gap G2 is existed between the rib 524 and the fixing plate 526, wherein the fixing plate 526 is the same as the second fixing plate 328 in the above embodiment. Referring to the first hollow tube 510, an opening 512c is existed at the main portion 512 for the electric wire penetrating.

In the embodiment of FIG. 4A and FIG. 4B, the second hollow tube 520 with non-closed contour has better elasticity and clamping force to restrain and hold the extending portion 514 of the first hollow tube 510 for assurance of enough torsion force is generated. A lubricant (not shown) is adapted to be smeared onto the extending portion 514, especially to be filled into the grooves 514a, so as to increase the lubricity between the first hollow tube 510 and the second hollow tube 520 while being rotated under the torsion force is generated. The rib 524 is configured to prevent the lubricant to be overflowed out of the tubing body 522 and also cover the gap G2 for better aesthetics.

Referring to FIG. 4A and FIG. 4C, in the embodiment, the first hollow tube 510 comprises a first tubing member B1 and a second tubing member B2 connected to each other with partially overlapped, and the extending portion 514 is a portion of the second tubing member B2 not overlapped by the first tubing member B1. Specifically, the second tubing member B2 is divided into segments L1, L2, wherein the segment L1 is regarded as the extending portion 514, the segment L2 is overlapped by the first tubing member B1, wherein cross sections of overlapped portions of the first tubing member B1 and the second tubing member B2 are non-circular, and a rough outer surface 514b of the second tubing member B2 is overlapped by the first tubing member B1. The non-circular cross section of the second tubing member B2 is composed of the rough outer surface 514b and planes 514c, and the non-circular cross section of the first tubing member B1 is composed of rounded surfaces 512b and planes 512a. The segment L2 is composed of planes 514c and round surfaces (the rough outer surface 514b) interlaced with each other, the round surface with rough structure thereon to be form the rough outer surface 514b, and the rough outer surface 514b is composed of a plurality of linear protrusions and linear grooves interlaced with each other. An inner wall of the first tubing member B1 is composed of planes 512a and rounded surfaces 512b interlaced with each other to be adapted to the segment L2, and a friction force is generated between the rough outer surface 514b and the inner wall of the first tubing member B1, such that the second tubing member 514 is fixed to the first tubing member 512.

Based on above, in the design of the pivoting mechanism of the present disclosure, the second hollow tube is rotatably sleeved on the first hollow tube to generate a torsional force with the first hollow tube. Therefore, the pivoting mechanism of the present invention has a simple assembling procedure and effectively reduces the manufacturing cost. Since the pivoting mechanism of the present disclosure adopts the design of the hollow tube structure as the pivoting member, the first hollow tube and the second hollow tube can be respectively used as the appearance members. The pivoting mechanism of the present disclosure has less thickness and much lightweight as compared to the conventional pivoting mechanism by adding an appearance member.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pivoting mechanism, comprising: a first hollow tube; and a second hollow tube, rotatably sleeved on the first tube to generate a torsion force with the first hollow tube; the first hollow tube comprises a main portion with a non-circular cross section opening sleeves a rough outer surface of a first segment of an extending portion; and the second hollow tube comprises a rib extending outwardly from an edge of a non-closed contour; and at least one groove located on a second segment of the extending portion, and a space is existed between the groove and an inner wall of the non-closed contour of the second hollow tube when the second hollow tube is sleeved on the extending portion; and the first hollow tube comprises a first fixing plate fixed to a main body of an electronic device, and the second hollow tube comprises a second fixing plate fixed to a bracket of the electronic device.

2. The pivoting mechanism according to claim 1, wherein the first hollow tube comprises a first tubing member and a second tubing member connected to each other with partially overlapped, and the extending portion is a portion of the second tubing member not overlapped by the first tubing member.

3. The pivoting mechanism according to claim 2, wherein cross sections of overlapped portions of the first tubing member and the second tubing member are non-circular.

4. The pivoting mechanism according to claim 1, wherein the first hollow tube comprises a first opening, a second opening, and a third opening, the first opening and the second opening are located at opposite ends of the first hollow tube, and the third opening is located between the first opening and the second opening,
wherein a facing direction of the third opening is different from a facing direction of the first opening, and the facing direction of the third opening is different from a facing direction of the second opening.

5. The pivoting mechanism according to claim 1, wherein the first hollow tube comprises at least one first locking portion, the second hollow tube comprises at least one second locking portion, and the first locking portion is locked with the second locking portion to limit a relative motion of the first hollow tube and the second hollow tube.

6. An electronic device, comprising: a first body, comprising a main body and a bracket; and at least one pivoting mechanism, comprising: a first hollow tube, pivoted to the bracket of the first body, a second hollow tube, pivoted to the main body of the first body and rotatably sleeved on the first hollow tube to generate a torsion force with the first hollow tube, wherein the main body and the bracket are rotated relatively via the pivoting mechanism; the first hollow tube comprises a main portion with a non-circular cross section opening sleeves a rough outer surface of a first segment of an extending portion; and the second hollow tube comprises a rib extending outwardly from an edge of a non-closed contour; and at least one groove located on a second segment of the extending portion, and a space is existed between the groove and an inner wall of the non-closed contour of the second hollow tube when the second hollow tube is sleeved on the extending portion; and the first hollow tube comprises a first fixing plate fixed to the main body of an electronic device, and the second hollow tube comprises a second fixing plate fixed to the bracket of the electronic device.

7. The electronic device according to claim 6, wherein the first hollow tube comprises a main portion and an extending portion connected to the main portion, an outer diameter of the extending portion is less than an outer diameter of the main portion, an outer diameter of the second hollow tube is greater than the outer diameter of the extending portion, and the second hollow tube is sleeved on the extending portion of the first hollow tube.

8. The electronic device according to claim 7, wherein the first hollow tube comprises a first tubing member and a second tubing member connected to each other with partially overlapped, and the extending portion is a portion of the second tubing member not overlapped by the first tubing member.

9. The electronic device according to claim 6, wherein the first hollow tube comprises a first opening, a second opening, and a third opening, the first opening and the second opening are located at opposite ends of the first hollow tube, and the third opening is located between the first opening and the second opening, wherein a facing direction of the third opening is different from a facing direction of the first opening, and the facing direction of the third opening is different from a facing direction of the second opening.

10. The electronic device according to claim 6, wherein the first hollow tube comprises at least one first locking portion, the second hollow tube comprises at least one second locking portion, and the first locking portion is locked with the second locking portion to limit a relative motion of the first hollow tube and the second hollow tube.

11. The electronic device according to claim 6, further comprising:

a second body, pivoted to the first body; and an electric wire, having a first end and a second end opposite to each other, penetrating the first hollow tube and the second hollow tube, wherein the first end is electrically connected to the first body, and the second end is electrically connected to the second body.

* * * * *